United States Patent [19]

Gandini

[11] 4,077,716
[45] Mar. 7, 1978

[54] ILLUMINATING EQUIPMENT FOR A PHOTOGRAPHIC ENLARGING OR COPYING APPARATUS

[75] Inventor: Mario Gandini, Brixen, Italy

[73] Assignee: Durst Ag. Fabrik Fototechnischer, Bolzano-Bozen, Italy

[21] Appl. No.: 725,255

[22] Filed: Sep. 21, 1976

[30] Foreign Application Priority Data

Sep. 22, 1975  Italy ............................ 4844 A/75

[51] Int. Cl.² ........................................... G03B 27/54
[52] U.S. Cl. ........................................ 355/67; 362/18; 362/359
[58] Field of Search ............... 355/67, 71; 240/46.23, 240/46.03, 1.3, 44.1

[56] References Cited

U.S. PATENT DOCUMENTS

| | | | |
|---|---|---|---|
| 3,684,371 | 8/1972 | Weisglass et al. | 355/71 |
| 3,831,021 | 8/1974 | Muhlogger | 355/71 X |
| 3,874,792 | 4/1975 | Turner | 355/67 |
| 4,009,383 | 2/1977 | Beier | 355/67 |

*Primary Examiner*—Richard A. Wintercorn
*Attorney, Agent, or Firm*—Connolly and Hutz

[57] ABSTRACT

An illumating device for a photograph enlarging or copying apparatus has a pair of lighting compartments having different characteristics movably connected to each other and mounted to slide back and forth across the optical axis. The light compartment better adapted to the particular format to be copied is positioned in line with the optical axis. A diffusing lens is insertable in the light emergence side of the lighting compartment being utilized, and the diffusing lens may be movably mounted so as to position different areas in the path of light emerging from the compartment.

11 Claims, 5 Drawing Figures

ILLUMINATING EQUIPMENT FOR A PHOTOGRAPHIC ENLARGING OR COPYING APPARATUS

BACKGROUND OF THE INVENTION

The invention relates to an illuminating device for a photographic enlarging or copying apparatus.

Such illuminating devices are designed for the largest nominal format to be illuminated of an original copy to be copied. However, all smaller formats must also be copied. For this purpose the corresponding copy holders inserted into the illuminating apparatus are equipped with masks, adapted to the individual formats to be copied, which hold back the light of the non-utilized, illuminated format surface or reflect it into the illuminating device. Since the light yield in copying smaller formats than the nominal format is small, illuminating equipment has been developed with interchangeable lighting compartments adapted to the individual formats in cross section, making possible an optimum light yield for original copies of various formats. In the known illuminating devices, the interchange of these lighting compartments is connected with a certain expenditure, since their location in the respective illuminating devices is obtainable with difficulty and apparatus parts must therefore be removed or lifted up, the lighting compartment must be removed and the lighting compartment adapted to the copy format inserted in place of the removed compartment. In addition, there exists the danger that the lighting compartments not directly inserted into the illuminating device may become dirty or damaged by careless storage. The switching of the lighting compartments can be advantageous with respect to cutout enlargements but are hardly ever utilized in the known devices because of the complications in such an exchange.

Illuminating devices have indeed become known wherein a quick alteration of the cross section of a lighting compartment is possible without the necessity of removing apparatus parts, so that the given drawbacks no longer pertain. Thus, DT-OS 2,326,900 = U.S. Pat. No. 3,831,021, discloses an illuminating device for an enlarging apparatus wherein the cross section of a lighting compartment is continuously variable. The subject matter of DT-OS 2,238,944 is a lamp housing for enlarging apparatus, wherein the shape of a lighting compartment for the purpose of a format adaptation is transformable from a truncated pyramidal shape into another truncated pyramidal shape.

However, both of the aforementioned illuminating devices have the drawback that they may be utilized for only a certain shape of a lighting compartment. This shape, in the case of DT-OS 2,326,900, can only be that of a parallelepiped, in the case of DT-OS 2,238,944, that of a truncated pyramid, and in an in between case, that of a parallelepiped. But in the event that a lighting compartment has a form different therefrom, e.g. a mixes parallelepiped and truncated pyramidal shape, both suggestions for a solution are inapplicable.

A further drawback of such illuminating devices consists in that the light mixing or the light distribution can be ideal only for a single original copy format. In illuminating devices for enlarging and copying appratus, it is known to provide at the light admitting and/or emerging surface of the lighting compartment, diffusing lenses, which have various densities and various cross-sectional shapes, depending on the mixing and distributing conditions of the light upon admission to the particular lighting compartment. The density and/or the cross-sectional shape of the diffusing lenses vary particularly in one and the same apparatus with each lighting compartment adapted to a particular original copy format.

The object of the invention is to provide an illuminating device of the previously stated type, wherein lighting compartments of various cross-sections and/or various shape are provided, in a manner convenient for an operating technician, for the individual original copy formats to be illuminated, the light mixing and/or distribution being maximizable for each format

BRIEF SUMMARY OF THE INVENTION

An illuminating device for a photographic enlarger or copying apparatus has a pair of lighting compartments having one movable common wall. One of the compartments is larger then the other and it can entirely receive the smaller compartment when it is slid within the larger compartment in line with the optical axis. The larger compartment may have the form of a truncated pyramid and the smaller compartment may be a parallelepiped. Light diffusing lenses or screens may be arranged at the light admission and light emergence sides of the compartments. When a diffusing lens is required in line when only one of the compartments, it is mounted to pivot into and out of line with the optical axis by means of rectangular and triangular cam extensions would cooperate with suitably arranged actuators.

The noval arrangement makes it possible possible to achieve the advantage of a space-saving accommodation of two lighting compartments, maximally adapted to the particular original copy format, in the housing of an illuminating device and their easy and quick interchangeability.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
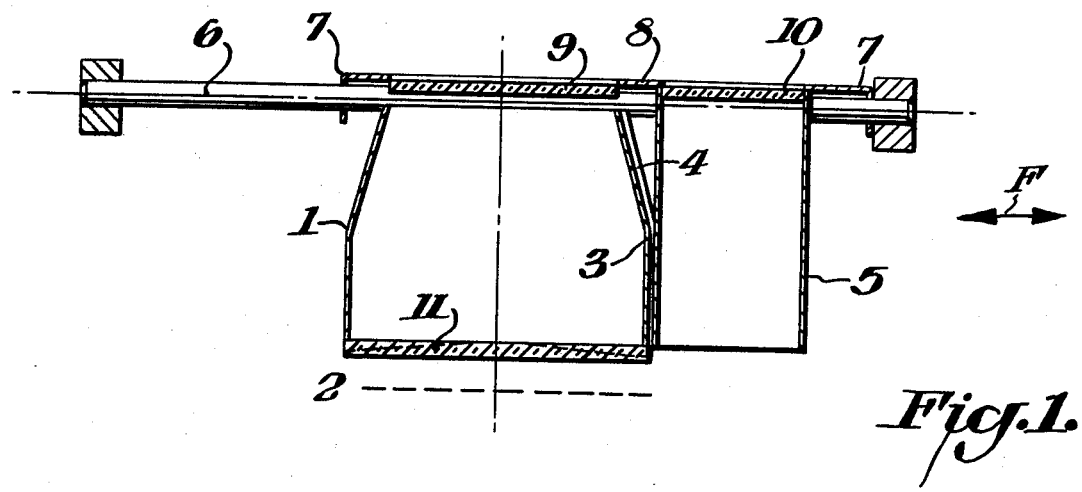
FIG. 1 partially in cross section is a front view in elevation of an illuminating device of the invention with two lighting compartments.

A rigidly mounted lighting compartment 1 of an illuminating device whose section, facing the original copy 2 to be copied, has a parallelepiped shape and whose section facing a (non-illustrated) copying light source has a truncated pyramid shape consists of three side sections, rigidly connected together, and a fourth movable side section 3, which may be separated from the remaining lighting compartment 1 and is supported on the surfaces of shafting 4, which are connected therewith. Rigidly connected with this movable side section 3 is a lighting compartment 5, in the form of a parallelpepiped for example, whose dimensions are determined in such a manner that it may be inserted into the interior of the first lighting compartment 1.

Lighting compartment 5 and side section 3 of the lighting compartment 1 are movably mounted on guide elements, e.g. on guide bars 6 disposed parallel to the plane of original copy 2, by corresponding connecting pieces 7, in the direction of arrows F. By means of a (non-illustrated) actuating member, accessible from the outside of the illuminating device, lighting compartment 5, arranged movably in the described manner, together with the side section 3 of lighting compartment 1 can be inserted along guide bars 6 into the interior space thereof.

Figure 2:
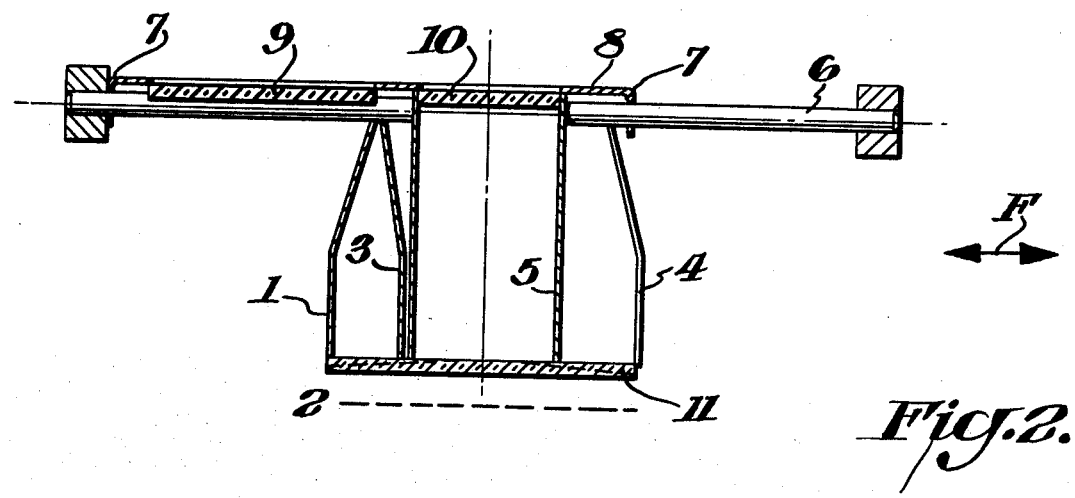
FIG. 2 is another front view in elevation showing the lighting compartments of FIG. 1 in a different physical arrangement from that shown in FIG. 1.
Figure 3:
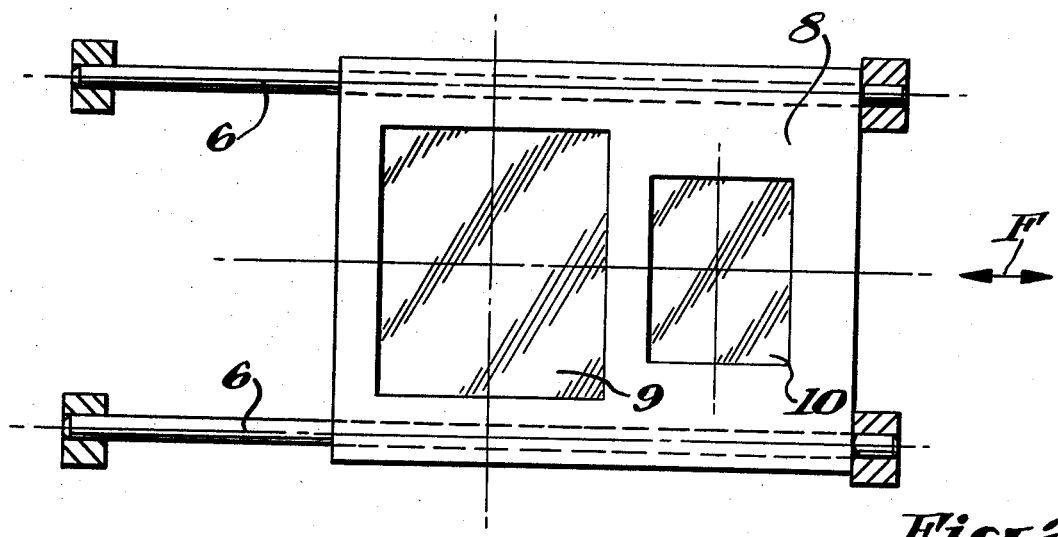
FIG. 3 is a top plan view of the lighting compartments in the correlation of FIG. 1.

In the correlation of both lighting compartments 1 and 5, illustrated in FIG. 1, the larger original copy format corresponding to lighting compartment 1 is illuminated; while in the correlation illustrated in FIG. 2, the copying light is limited by lighting compartment 5 and the smaller format corresponding there is illuminated, the light intensity being correspondingly higher, since the light radiated from the copying light source remains unchanged. Rigidly connected with the movable lighting compartment 5 is a substantially flat diffusing lens holder 8, arranged parallel to the original copy plane, said holder carrying the diffusing lenses at the light-admission side of the lighting compartments, e.g. a diffusing lens 9 for lighting compartment 1 and a diffusing lens 10 for lighting compartment 5. The diffusing lens holder 8 is connected with lighting compartment 5 in such a manner that in the correlation illustrated in FIG. 1 of lighting compartments 1 and 5, diffusing lens 9 is located in the path of rays of the light radiated from the copying light source; and in the correlation illustrated in FIG. 2, diffusing lens 10 is located in this path of such light rays.

Lighting compartment 1 is similarly provided at the light-emergence side with a diffusing lens 11, which may simultaneously serve as a diffusing lens for lighting compartment 5 if said compartment's length is determined in such a manner that it may be inserted above the diffusing lens 11. However, it is also possible that for the two formats to be illuminated, different diffusing lenses are needed also at the light-emergence side of both lighting compartments. In such a case, a holder corresponding to diffusing lens holder 8 and rigidly connected with lighting compartment 5, is provided for such diffusing lenses, Moreover, diffusing lens 11 is eliminated.

Not in every case it is necessary that diffusing lenses be present at the light-admission side of lighting compartments. Particularly with respect to lighting compartments which are intended for the illumination of smaller formats, a diffusing lens may be eliminated; thus, for lighting compartment 5, for example, diffusing lens 10 can be eliminated, there being provided in the diffusing lens holder 8 an aperture corresponding to the cross section of the lighting compartment 5.

The diffusing lenses can have different cross-sectional shapes for affecting the light distribution at the light-emergence surface; one of these diffusing lenses can be convex and the second flat, for example.

In the event that only for one of the two lighting compartments 1 or 5 at whose light-admission or emergence side of diffusing lens is needed, it can be arranged to pivot in the illuminating device, the pivoting movement of the corresponding diffusing lens being coupled with the movement of the movable lighting compartment 5 in such a manner that said lens, at one of the two end positions of the movable lighting compartment, is situated in the path or rays of the copying light and outside this path of rays in the second position.

Figure 4:
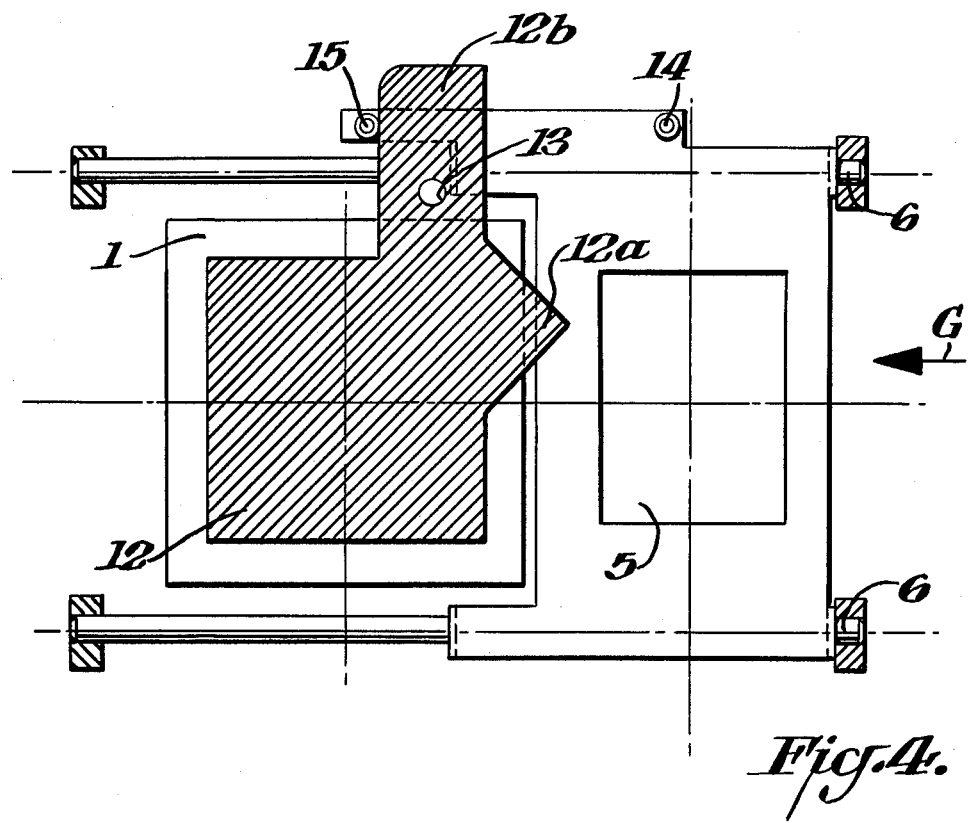
FIG. 4 is a top plan view of another embodiment of the illuminating device of the invention with a pivotable diffusing lens.
Figure 5:
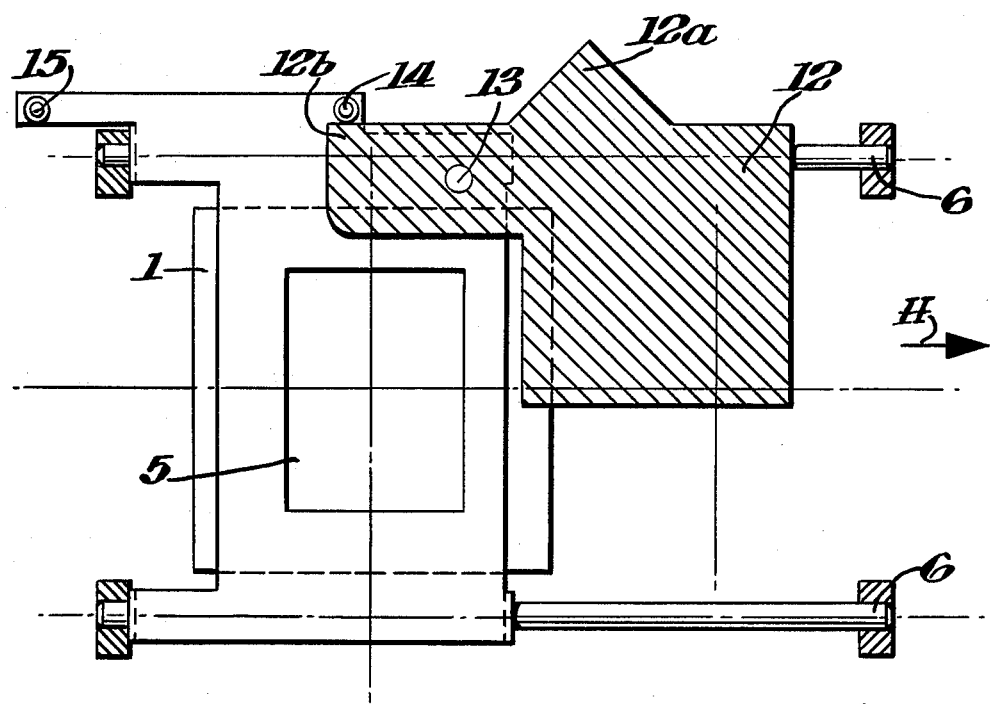
FIG. 5 is another top plan view of the illuminating device of FIG. 4 in a different physical arrangement of the lighting compartments.

Illustrated in FIGS. 4 and 5 are the two possible end positions of such a diffusing lens 12: In FIG. 4, said lens is situated, together with the lighting compartment 1 affecting the largest format to be illuminated, in the path of rays of the copying light, while in FIG. 5 the movable lighting compartment 5 affects the illuminated format and the diffusing lens 12 is pivoted away from the path of rays. Such an arrangement of the diffusing lens enables a space saving for the illuminating device as opposed to the exemplary embodiment wherein a movable diffusing lens holder 8 is inserted together with the movable lighting compartment 5.

For the coupling of the pivoting movement of diffusing lens 12 with the connecting movement of lighting compartment 5, two pins 14 and 15, connected thereto, are in operative connection with the correspondingly shaped parts 12a and 12b of diffusing lens 12, so that with a movement of lighting compartment 5 in direction of arrow G (FIG. 4) diffusing lens 12 turns about an axis of rotation 13 counterclockwise and pivots away from the path of rays of the copying light and with a sliding compartment 5 in the direction of arrow H (FIG. 5), diffusing lens 12 turns clockwise about axis of rotation 13 and is pivoted into the path of rays

I claim:

1. An illuminating device for photographic enlarging and copying apparatus having an optical axis comprising a pair of lighting compartments including a first and a second compartment, the first compartment being mounted on the optical axis, the second compartment movably mounted for movement between a position outside the first compartment remote from the optical axis to a position disposed upon it, the first compartment having a first predetermined cross-sectional shape and size for providing advantageous illumination for a first format to be illuminated, the first compartment being large enough to receive the second compartment within it when the second compartment is disposed on the optical axis, the second compartment having a second predetermined cross-sectional shape and size for providing advantageous illumination for a second format to be illuminated, the first compartment having a separate wall section disposed adjacent the second compartment and attached to it, slide means mounting the second compartment and connected wall section of the first compartment, whereby either the first compartment is operatively disposed on the optical axis or the second compartment is operatively disposed on the optical axis within the first compartment, and the second compartment being constructed and arranged to move through the space provided when the separate wall section of the first compartment is slid within the first compartment.

2. An illuminating device for photographic enlarging and copying apparatus having an optical axis comprising a pair of lighting compartments including a first and a second compartment, the first compartment being mounted on the optical axis, the second compartment movably mounted for movement between a position outside the first compartment remote from the optical axis to a position disposed upon it, the first compartment being large enough to receive the second compartment within it the second compartment is disposed on the optical axis, the first compartment having a separate wall section disposed adjacent the second compartment and attached to it, slide means mounting the second compartment and connected wall section of the first compartment, whereby either the first compartment is operatively disposed on the optical axis or the second compartment is operatively disposed on the optical axis within the first compartment, and the second compartment being constructed and arranged to move through the space provided when the separate wall section of the first compartment is slid within the first compartment, connected with the movable second lighting compartment is a duffusing screen holder, at least one diffusing screen being mounted in the holder which is insertable at the light-admission side of the at least one of the lighting compartments operatively disposed on the optical axis.

3. An illuminating device for photographic enlarging and copying apparatus having an optical axis comprising a pair of lighting compartments including a first and a second compartment, the first compartment being mounted on the optical axis, the second compartment movably mounted for movement between a position outside the first compartment remote from the optical axis to a position disposed upon it, the first compartment being large enough to receive the second compartment within it when the second compartment is disposed on the optical axis, the first compartment having a separate wall section disposed adjacent the second compartment and attached to it, slide means mounting the second compartment and connected wall section of the first compartment, whereby either the first compartment is operatively disposed on the optical axis or the second compartment is operatively disposed on the optical axis within the first compartment, and the second compartment being constructed and arranged to move through the space provided when the separate wall section of the first compartment is slid within the first compartment, connected with the movably arranged second lighting compartment is a diffusing screen holder, at least one diffusing screen being mounted in the holder which is insertable at the light-emergence side of at least one of the lighting compartments operatively disposed on the optical axis 4. An illuminating device for photographic enlarging and copying apparatus having an optical axis comprising a pair of lighting compartments including a first and a second compartment, the first compartment being mounted on the optical axis, the second compartment movably mounted for movement between a position outside the first compartment remote from the optical axis to a position disposed upon it, the first compartment being large enough to receive the second compartment within it when the second compartment is disposed on the optical axis, the first compartment having a separate wall section disposed adjacent the second compartment and attached to it, slide means mounting the second compartment and connected wall section of the first compartment, whereby either the first compartment is operatively disposed on the optical axis or the second compartment is operatively disposed on the optical axis within the first compartment, and the second compartment being constructed and arranged to move through the space provided when the separate wall section of the first compartment is slid within the first compartment, a diffusing screen is mounted on the side of the first light compartment for disposition in the path of light rays passing through it, and pivot means mounts the diffusing screen on the device for disposition in and away from the optical axis.

5. An illuminating device as set forth in claim 4, wherein interconnecting means connects the diffusing screen with the movably mounted second lighting compartment for causing the movement if the second lighting compartment to control the position of the diffusing screen.

6. An illuminating device for photographic enlarging and copying apparatus having an optical axis comprising a pair of lighting compartments including a first and a second compartment, the first compartment being mounted on the optical axis, the second compartment movably mounted for movement between a position outside the first compartment remote from the optical axis to a position disposed upon it, the first compartment being large enough to receive the second compartment within it when the second compartment is disposed on the optical axis, the first compartment having a separate wall section disposed adjacent the second compartment and attached to it, slide means mounting the second compartment and connected wall section of the first compartment, whereby either the first compartment is operatively disposed on the optical axis or the second compartment is operatively disposed on the optical axis within the first compartment, and the second compartment being constructed and arranged to move through the space provided when the separate wall section of the first compartment is slid within the first compartment, on the light-emergence side of the first lighting compartment is arranged a diffusing screen, and the movably mounted second lighting compartment being dimensioned in such a manner that it may be inserted above the diffusing screen within the interior of the first lighting compartment.

7. An illuminating device as set forth in claim 1, wherein the first lighting compartment is comprised of three stationary wall sections and a fourth movable wall section, and the fourth movable wall section being connected to the second compartment.

8. An illuminating device as set forth in claim 4, wherein cam means are connected to the diffusing screen, actuating means being connected to the second compartment for contact with the cam means during movement of the second compartment onto and away from the optical axis whereby the diffusing screen is disposed on the optical axis when the second compartment is remote from the optical axis and the diffusing screen is disposed away from the optical axis when the second compartment is disposed within the first compartment on the optical axis.

9. An illuminating device as set forth in claim 8, wherein the the cam means comprises a substantially rectangular cam projection disposed about the pivot means, and a triangular cam projection disposed away from the pivot means towards the second compartment when it is disposed remote from the first compartment.

10. An illuminating device as set forth in claim 9, wherein the actuating means comprises a pair of projections connected to the second compartment in line with the rectangular cam when the diffusing screen is disposed on the optical axis and in line with the triangular cam when the diffusing screen is disposed remote from the optical axis.

11. An illuminating device as set forth in claim 1, wherein the first compartment has a combination truncated pyramidal and parallelepiped shape and the second compartment has a parallelepiped shape.

* * * * *